Dec. 11, 1934.   H. W. DAUBENMEYER   1,983,602
ELASTIC MOLD AND METHOD OF MOLDING MATERIAL
Filed April 10, 1933
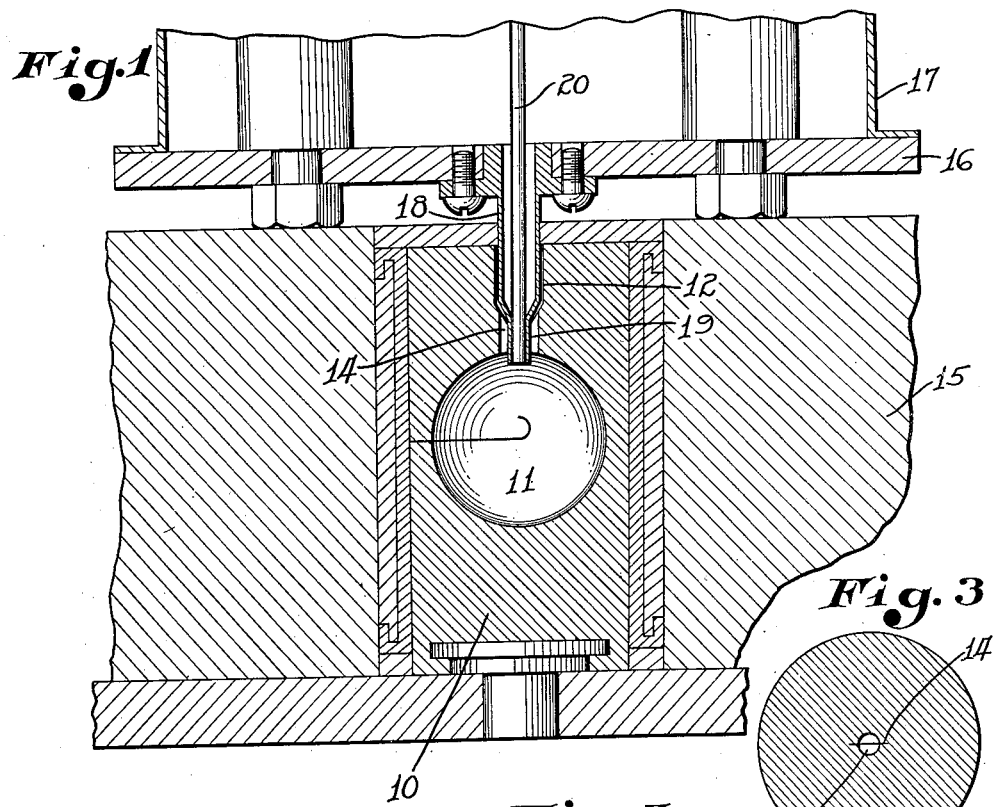
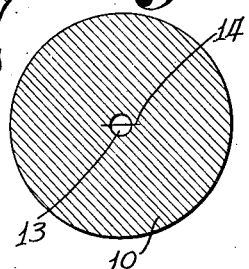
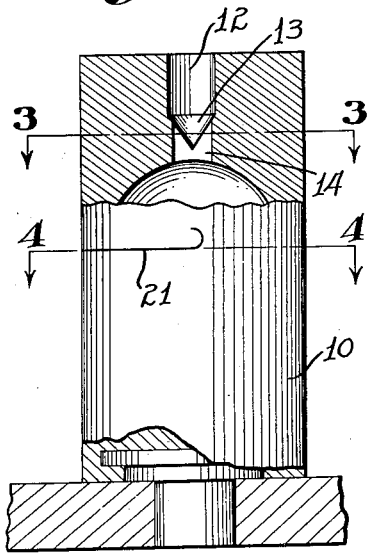
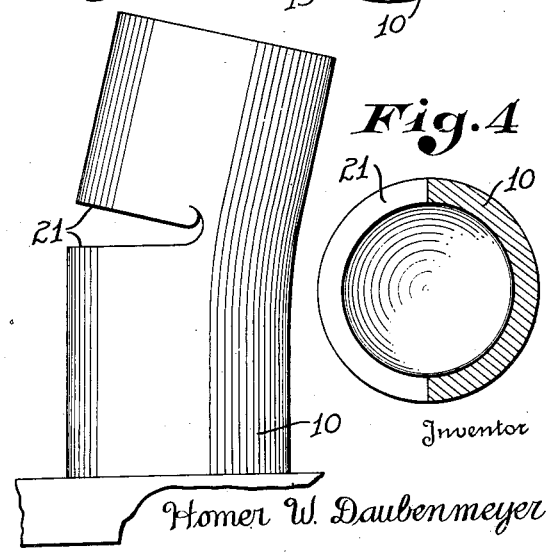
Homer W. Daubenmeyer
By Owen & Owen
Attorneys Patented Dec. 11, 1934

1,983,602

UNITED STATES PATENT OFFICE 1,983,602

ELASTIC MOLD AND METHOD OF MOLDING MATERIAL

Homer W. Daubenmeyer, Detroit, Mich., assignor to Champion Spark Plug Company, Toledo, Ohio, a corporation of Delaware Application April 10, 1933, Serial No. 665,388

12 Claims. (Cl. 18—34)

This application relates to an elastic mold and more particularly to such a mold so constructed that it may be filled and discharged without leaving on the molded article any appreciable mark where the filling or discharge opening pours in the mold cavity. Further objects and details of the invention will appear as the description proceeds.

In the accompanying drawing forming a part of this specification, Figure 1 is a vertical cross section of one form of mold embodying the invention and shown in filling position;

Figure 2 is a side elevation of the same mold with a part broken away;

Figures 3 and 4 are cross sections on the lines 3—3 and 4—4, respectively, on Figure 2;

Figure 5 is a side elevation of the mold in discharging position.

The mold proper in the form illsutrated in the drawing consists of a cylindrical rubber member 10. The mold is shown with a spherical mold cavity 11 therein. Above the mold cavity there is a cylindrical socket 12 having a conical bottom 13 ending a short distance above the mold cavity. The material between the conical surface 13 and the mold cavity is slit, as shown at 14 in Figures 2 and 3.

In Figure 1 the mold is shown enclosed in a casing 15, which may be employed to contain fluid and thereby exert hydraulic pressure upon the exterior of the mold during the pressing operation. This arrangement forms no part of the present invention and, therefore, need not be described in detail.

There is also shown in Figure 1 a filling device 16 connected with the mold. This comprises a container for material 17, which may be dust like material or rounded pellets. Extending downward from the container there is a sleeve 18 having a reduced bottom portion 19. The upper part of sleeve 18 fits somewhat freely within the upper part of cylindrical cavity 12, while the lower reduced portion 19 may be forced downward through slit 14 so as to provide a charging opening into the mold cavity. A rod 20 is provided which forms a valve for the reduced opening through portion 19. It will be readily understood that when rod 20 is raised, with the parts otherwise in the position shown in Figure 1, material is charged into the mold. Air may escape from the mold cavity during the charging operation through the ends of slit 14 and around the sleeve.

After the mold has been thus charged, it is separated from the charging device and the slit 14 automatically closes so as to leave no opening at the top of the mold cavity. Thereafter hydraulic pressure or the like is exerted upon the exterior of the mold and is transmitted by the rubber walls of the mold to the contents of the mold cavity which is thus compressed equally from all directions and forms a substantially perfect sphere.

After the material has been thus pressed, the mold is removed from the pressing casing and is opened up along slit 21, as shown in Figure 5. This slit is shown as a straight cut from one side of the mold to the intersection of the axis of the mold and the axis of the spherical cavity therein. The slit is then extended from this point in a curved direction, the curve being shown as extending downward substantially semi-circularly upward. They might be curved downward with about the same result. With this arrangement the mold may be repeatedly opened and closed, as indicated in Figure 5, without tearing the opening slit at the end thereof, and at the same time there is no slit in the mold parallel with the longitudinal axis of the mold. If there were such a slit, it might tend to open when the filling tube is inserted in the top of the mold, thereby distorting the mold. A slit thus opened to any extent during the filling of the mold would receive some of the material which during pressing would constitute a ridge or fin upon the pressed article. The curved end to the opening slit avoids this difficulty while at the same time avoiding the tearing effect which might result from a straight end to the slit without this curved extension.

It will be readily understood that in place of slit 14 there might be three slits meeting at the center, or two crossed slits or the like, although the one straight slit answers every purpose and reduces the possibility of imperfections on the article to a minimum. With the construction disclosed, it will be readily seen that the mold material is pressed in against the mold filling slit and likewise the mold opening slit is subjected to compression of the material which, due to the elasticity of the mold walls, is transmitted in all directions. For this reason the filling and discharging slits do not open or tend to open during the pressing operation, but are pressed tightly shut by the same pressure which crowds the mold material against the contents of the mold.

It will be noted that the filling slit is at the top of the mold cavity during the filling operation and that, when the filling tube is withdrawn, it tends to lift the surrounding mold wall by friction exerted thereon. Thus this mold wall is lifted slightly above the contents of the filled mold at the moment when the removal of the filling tube allows the slit to close. Thereby a closing is obtained without danger of material being lodged within the slit during that closing.

While the mold disclosed is of cylindrical construction and the opening therein is indicated as spherical, it will be readily understood that the outlines both of the mold and of the mold cavity may be changed without departing from the spirit of the invention, the essential points of which are the construction of the mold cavity completely surrounded by elastic material such as rubber, and the filling and discharging of this mold cavity through slits which are self-closing during the pressing operation, so that a pressed article can be produced which is substantially uniform in density because of the uniform pressure exerted in all directions thereon, and which does not exhibit any surface imperfections due to the filling and discharging orifices in the mold. Various changes may be made in the construction of the mold and the operation thereof within the scope of the appended claims. If the shape of the article renders this procedure necessary, the filling may be through two or more properly placed slits.

What I claim is:—

1. In a device of the character described, a mold having a cavity therein, the mold wall on one side of the cavity being elastic and having a normally closed slot therethrough, in position to be forced open and have material fed therethrough into the mold, and means for pressing the elastic wall to simultaneously hold closed the slit and press the wall against the contents of the mold.

2. In apparatus of the character described, a mold having a cavity therein and an elastic wall above the cavity, there being a normally closed slit in said elastic wall adapted to have material fed therethrough into the mold cavity, and means to exert pressure upon said elastic wall and thereby hold the slit closed and press the wall against the contents of the mold cavity.

3. In apparatus of the character described, a mold having a mold cavity with an elastic wall over said cavity, a filling socket extending partially through said wall, and a normally closed slit in the bottom of said socket extending from the socket to the mold cavity and adapted to have material fed therethrough into said mold cavity.

4. Apparatus of the character described, comprising an elastic mold having a cavity therein and a normally closed discharge slit through the mold wall at one side of said cavity, and means for exerting pressure upon said elastic wall to simultaneously press the slit closed and the material of the wall against the contents of the mold cavity.

5. Apparatus of the character described, comprising a mold having a cavity therein, an elastic wall over the cavity having a filling slit therethrough and an elastic wall at the side of the cavity having a normally closed discharge slit therethrough.

6. Apparatus of the character described, comprising a mold having a normally closed cavity therein and elastic walls, said cavity being largest in cross section at a point below its top and there being a filling slit through the elastic wall over the top of the cavity, and a discharge slit through the elastic wall across the mold at approximately the level of the largest cross section of said cavity.

7. Apparatus of the character described, comprising a mold having a cavity therein and an elastic wall at one side of the cavity having a discharge slit therethrough, the ends of said slit being curved.

8. Means to form balls, comprising an elastic mold having a substantially spherical mold cavity therein, a filling slit through the elastic wall of the mold over the cavity, a discharge slit across the mold at one side of the cavity, said discharge slit being substantially horizontal and curved at its ends and both of said slits being normally closed, and means to compress the elastic mold walls to simultaneously hold said slits closed and press the walls against the contents of the cavity.

9. A method of molding material in an elastic mold, which comprises filling material through a slit in the elastic wall of the mold and exerting pressure upon the elastic wall to hold said slit closed and simultaneously press the contents of the mold.

10. A method of forming material in a mold having an elastic wall, which comprises filling the material into and discharging the pressed article from the mold through slits in said elastic wall, and exerting pressure upon the elastic wall to simultaneously hold said slits closed and press the contents of the mold.

11. The method of filling material into a mold having an elastic wall with a slit therein, which comprises inserting a tube through said slit, filling the material through said tube into the mold cavity, and then withdrawing the tube, and drawing the lips of the slit away from the mold cavity by friction upon said tube, and removing the tube and allowing said slits to close and return to normal position, thereby forming a closed wall of the mold.

12. The method of molding a ball in an elastic mold, which comprises filling the material into the mold cavity through a slit in the top thereof through a tube inserted in said slit, withdrawing the tube upwardly and thereby allowing the slit to close above the material, exerting pressure upon the elastic mold to simultaneously hold closed any slit in the wall of the mold, and to exert substantially uniform pressure in every direction towards the center of the spherical mold cavity and thereafter discharging the ball through a slit in the side of the mold.

HOMER W. DAUBENMEYER.